Jan. 3, 1928.
E. VOLLRATH
1,654,671
BELT PUNCH
Filed Jan. 31, 1927
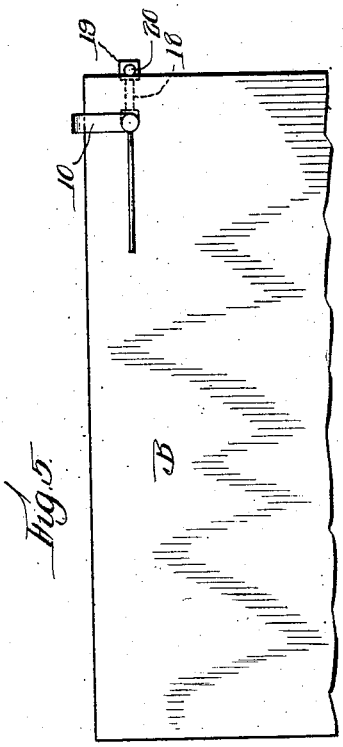
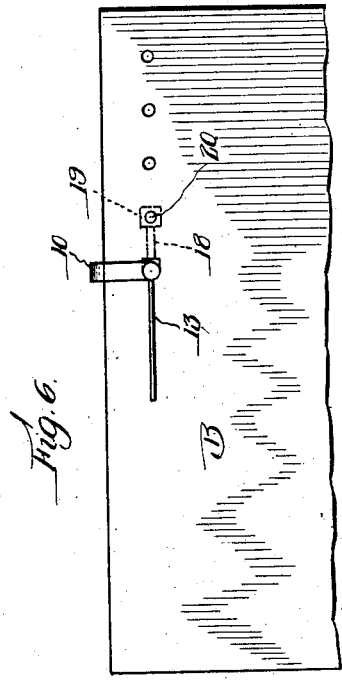
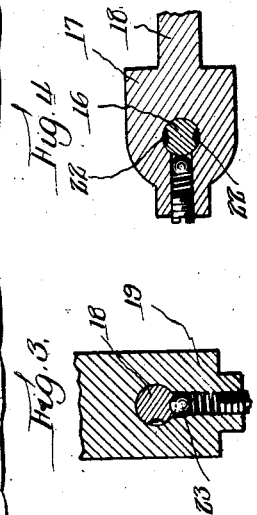
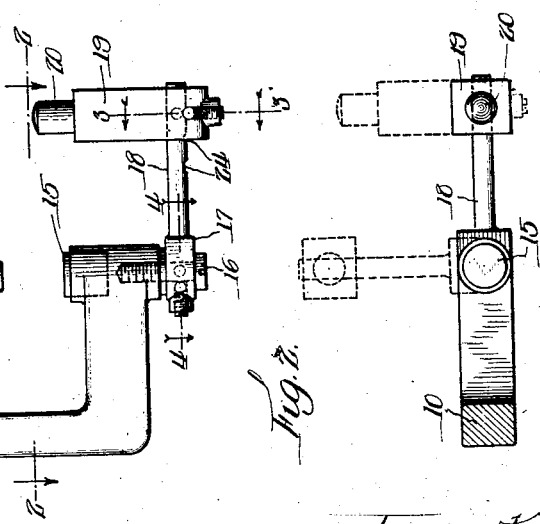
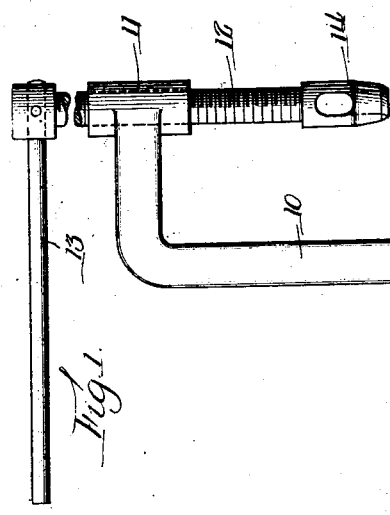
Inventor:
Edwin Vollrath,
By Fisher, Towle, Clapp + Soans
Attys.

Patented Jan. 3, 1928.

1,654,671

UNITED STATES PATENT OFFICE.

EDWIN VOLLRATH, OF EASTON, PENNSYLVANIA.

BELT PUNCH.

Application filed January 31, 1927. Serial No. 164,784.

This invention relates to tools for punching holes in the ends of belts employed for the transmission of power for the purpose of attaching fastenings on the same to unite the belt ends.

There are numerous known devices for this purpose comprising a C-frame having a screw through the upper part of the frame carrying the punching tool and a seat on the lower part of the frame to support the portion of the belt through which the hole is to be punched. When holes are punched in a belt by a tool of this character, it is necessary to measure off accurately the location of each hole and mark the same, and in mill practice this is a laborious and difficult operation when done accurately, and inaccurately punched holes frequently result.

The main object of the present invention is to provide in connection with the punch, an automatic gage by the use of which the holes will be formed at a fixed distance from the cut end of the belt and also at a measured distance from the edge to the first hole, and thereafter the holes will be spaced evenly both from the cut end of the belt and from the last hole punched until the entire line of holes across the end of the belt has been punched. A further object is to provide a tool that shall be adjustable to vary the spacing of the holes from each other and from the edges of the belt.

The novel structural features of the invention, its mode of use, and the advantages inhering therein will be better understood by reference to the following detailed description, taken in connection with the accompanying drawing, in which—

Fig. 1 is a side elevation of the tool showing the gage swung into the plane of the tool frame;

Fig. 2 is a sectional plan on the line 2—2 of Fig. 1, showing in dotted lines a working position of the gage, also a lowered position of the gage finger;

Fig. 3 is a sectional detail on the line 3—3 of Fig. 1;

Fig. 4 is a sectional detail on the line 4—4 of Fig. 1;

Fig. 5 is a plan view of a belt end showing my improved punching tool applied thereto in position to form the first hole of a row across the end of the belt;

Fig. 6 is a view to Fig. 5 showing an advanced position of the tool on the belt end.

Referring to the drawing, 10 designates a C-frame formed at its upper end with an internally threaded boss 11 through which passes a screw 12 equipped on its upper end with a handle 13 for turning the same. Fast on the lower end of the screw 12 is the hollow punch head 14. The lower arm of the C-frame carries a soft metal plug 15 directly below the punch head 14 to seat the portion of the belt through which the hole is to be punched. The lower part of the frame 10 directly beneath the plug 15 is tapped to receive a screw 16 that forms a vertical pivot for the hub 17 of a laterally extending gage arm 18. On the gage arm 18 is rotatably mounted a gage finger 19 terminating at its upper end in a reduced tip 20 of a diameter to accurately fit the holes formed in the belt by the punch head 14. The gage arm 18 is revoluble on the pivot bolt 16 and is adapted to be yieldably held in either of two positions at right angles to the plane of the frame 10 by means of any suitable spring catch or lock such, for instance, as a spring-pressed ball 21 (Fig. 4) mounted in the hub 17 engageable with either of a pair of notches 22 formed in opposite sides of the pivot screw 16. The finger 19 is yieldably held on the arm 18 against rotation by a similar spring-pressed catch such as the ball 23 (Fig. 3) mounted in the lower portion of the finger 19 engageable with any of a series of notches 24 on the under side of the arm 18 at different distances from the pivot axis of the latter. By this means the gage finger 19 can be set at different distances from the axis of the punch 14, and in shifting the tool from one hole to the next, the finger 19 can be swung downwardly, as indicated by dotted lines in Fig. 2, to horizontal or approximately horizontal position so that the tool can be slid along the end of the belt without interference by the tip 20 of the finger.

Figs. 5 and 6 illustrate the manner of using the tool in forming a row of holes across an end of the belt. Fig. 5 shows the tool applied to the belt end B in position to form the first of a series of holes starting from the right hand side of the belt. The frame 10 is passed over the end of the belt, its vertical member marking the distance inwardly from the edge of the belt, and the gage arm 18, with the finger 19 in lowered position, is swung beneath the belt to the position shown in Fig. 5, whereupon the finger 19 is raised into contact with the side edge of the belt, and the arm 18 and finger 19 thus measure the distance of the first hole from the edge of the belt. The first hole having been punched, the finger 19 is swung downwardly beneath the belt and the tool is slid along the end edge of the belt until the finger 19 underlies the first punched hole. Thereupon the finger is raised and its tip 20 inserted in the punched hole, and this determines the spacing and position of the second hole, and so on throughout the entire row. If it is convenient to start the row of holes from the left hand edge of the belt, this may readily be done by swinging the gage arm 18 through a half circle from the position shown in Fig. 5. Manifestly the number and spacing of the holes may be varied by setting the gage finger 19 at different distances on the arm 18 from the axis of the punch head 14.

By the use of this tool, it is possible to rapidly and accurately punch a row of bolt holes across the end of the belt without the necessity of previously measuring the distances of the holes from either the end edge or the side edge of the belt.

While I have herein shown and described one practical and efficient form of the invention it is manifest that the structural details may be variously modified without involving any departure from the principle of the invention or sacrificing any of the advantages thereof. Hence, I reserve all such variations, modifications, and mechanical equivalents as fall within the spirit and purview of the claims.

I claim—

1. In a tool for punching holes in a belt, the combination with a frame carrying a punch and an opposed belt rest, said frame serving as a gage from the end edge of the belt, of a gage arm vertically swiveled on and extending laterally of said frame to swing sidewise, and a gate finger mounted on said arm, said arm and finger serving to measure the distance from a side edge of the belt to the first hole.

2. In a tool for punching holes in a belt, the combination with a C-frame carrying a punch and an opposed belt rest, said frame serving as a gage from the end edge of the belt, of a gage arm swiveled on and extending laterally of said frame, a gage finger mounted on said arm, said arm and finger serving to measure the distance from a side edge of the belt to the first hole, and means for yieldably locking said arm in a position at right angles to the plane of said frame.

3. In a tool for punching holes in a belt, the combination with a C-frame carrying a punch and an opposed belt rest, said frame serving as a gage from the end edge of the belt, of a gage arm swiveled on and extending laterally of the lower end of said frame, a gage finger rotatably mounted on said arm, said arm and finger serving to measure the distance from a side edge of the belt to the first hole, means for yieldably locking said arm in a position at right angles to the plane of said frame, and means for yieldably locking said finger in an upright position on said arm.

4. In a tool for punching holes in a belt, the combination with a frame carrying a punch and an opposed belt rest, of a gage arm mounted on said frame, and a gage finger on said arm adjustable to different positions lengthwise of and around the latter.

EDWIN VOLLRATH.